United States Patent [19]

Spellane et al.

[11] Patent Number: 5,928,795
[45] Date of Patent: Jul. 27, 1999

[54] CORROSION RESISTANT ALUMINUM ARTICLE COATED WITH EMERALDINE BASE POLYANILINE

[75] Inventors: Peter J. Spellane, Ardsley; Francis A. Via, Yorktown Heights, both of N.Y.

[73] Assignee: Polymer Alloys LLC, Ardsley-on-Hudson, N.Y.

[21] Appl. No.: 08/383,280

[22] Filed: Feb. 3, 1995

[51] Int. Cl.$^6$ ..................................................... B32B 15/00
[52] U.S. Cl. ........................... 428/457; 428/461; 428/463
[58] Field of Search .......................... 427/388.1; 428/457, 428/461, 463; 252/500

[56] References Cited

U.S. PATENT DOCUMENTS

| | | | |
|---|---|---|---|
| 5,441,772 | 8/1995 | McAndrew et al. | 427/388.1 |
| 5,470,505 | 11/1995 | Smith et al. | 252/500 |
| 5,484,884 | 1/1996 | MacDiarmid et al. | 528/422 |
| 5,494,609 | 2/1996 | Kulkarni et al. | 252/500 |
| 5,658,649 | 8/1997 | Wrobleski et al. | 428/213 |
| 5,824,371 | 10/1998 | Epstein et al. | 427/388.1 |

FOREIGN PATENT DOCUMENTS

| | | | |
|---|---|---|---|
| 2000431 | 4/1990 | Canada . | |
| WO93/14166 | 7/1993 | WIPO | C09D 5/08 |

OTHER PUBLICATIONS

D.A. Wrobleski et al., "Corrosion Resistant Coatings from Conducting Polymers", Polymer Preprints, vol. 35, No. 1, Mar. 1994, pp. 265–266.

N. Ahmad et al., "Inhibition of Corrosion of Steels by Conducting Polymers", Session FF10, Bulletin of the American Physical Society, vol. 32, No. 3, Mar., 1987, p. 548.

B. Wessling, "Passivation of Metals by Coating with Polyaniline: Corrosion Potential Shift and Morphological Changes", Advanced Materials, Communications, vol. 6, No. 3, pp. 226–228 Jun. (1994).

K.G. Thompson et al., "Corrosion–Protective Coatings From Electrically Conducting Polymers", Technology 2001, The Second National Technology Transfer Conference and Exposition, Conference Proceedings, Dec., 1991, pp. 339–347.

*Primary Examiner*—Stevan A. Resan
*Attorney, Agent, or Firm*—Richard P. Fennelly

[57] ABSTRACT

The present invention relates to a corrosion resistant metal article which comprises: (a) a metal body normally prone to corrosion when subjected to potentially corrosive conditions, other than stainless steel or a metal similar to stainless steel; and (b) a neat coating of neutral, undoped polyaniline in the emeraldine base form on the metal body.

1 Claim, No Drawings

CORROSION RESISTANT ALUMINUM ARTICLE COATED WITH EMERALDINE BASE POLYANILINE

BACKGROUND OF THE INVENTION

There has been a series of reports in the scientific literature during the last decade on the corrosion protection offered by various forms of polyaniline when coated onto a metal surface that is normally prone to corrosion upon exposure to conditions which can give rise to corrosion including the following:

G. Mengoli et al., Journal of Applied Polymer Science, Vol. 26, 4247–4257 (1981) reported the anodic synthesis of polyaniline coatings onto iron sheets.

D. W. DeBerry, in Journal of the Electrochemical Society: Electrochemical Science and Technology, May 1985, pp. 1022–1026 electrochemically deposited polyaniline onto stainless steel and concluded that a polyaniline emeraldine salt coating appeared to be deposited over a native passive metal oxide film which was said to be maintained by doped polyaniline.

Los Alamos National Laboratory scientists (see ACS Polymer Preprints, Vol. 35, 265, March, 1994) have utilized a doped form of polyaniline as a primer coat with a topcoat of either epoxy or polyurethane.

Wessling and coworkers (see, for example, Adv. Mater. Vol. 6, 226, 1994) have utilized a proprietary partially doped form of polyaniline (VERSICON brand from Allied-Signal) in treating metal surfaces.

A. G. MacDiarmid and coworkers have indicated that the emeraldine state of the polyaniline had been used to coat steel which was said to be "similar" to stainless steel, which is known to persons of ordinary skill in the art to not be normally prone to corrosion, without any discussion of the results obtained in regard to corrosion protection of the metal (N. Ahmad et al., Bull. of the Amer. Phys. Soc., Program of the March 16–20, 1987 Meeting, Vol. 32, No. 3, p. 548, Abstract FF10). These investigators had also earlier indicated that the p-doped (partially oxidized) form of "certain conducting polymers" had a potential suitable in principle for the anodic passivation of "certain" steels including areas from which such partially doped materials had been removed.

In another publication (NASA Conference Publication 3136, Vol. 1, "Technology 2001", The Second National Technology Transfer Conference and Exhibition, Dec. 3–5, 1991, San Jose, Calif. pp. 339–347), these authors state that "by increasing the electrical conductivity of the polymer, dopants provide the proper electronic environment to impart corrosion resistance and acid resistance to the film ".

Canadian Patent Application No. 2,000,431 discloses a process for the production of thin or ultra-thin layers of inherently conductive polymers on various substrates wherein the conductive components are formed "by deposition from a meta-stable dispersion of the intrinsically conductive polymers" (page 6, lines 5–6). It is specified in this Canadian patent document that the "meta-stable dispersions are obtained when the conductive ("doped") forms of the intrinsically conductive polymers are dispersed" in particular solvents. This patent document indicates at page 7, lines 32–33 that the neutral forms of intrinsically conductive polymers "form mainly stable dispersions" so as to be distinguishable therefrom. This difference in made explicit in Examples 7 and 8 (page 16). Example 8 teaches that use of the dispersion of neutral polyaniline produced as specified in Example 7 in a "dispersion suitable for the coating process" requires dilution with another solvent "which contains the doping acid".

Recent PCT International Patent Publication No. WO 93/14166 teaches that metals can be coated with a formulation which contains polyaniline which is derived from polyaniline tosylate which has been either treated with a sulfonic acid wash to yield a partially doped polyaniline or with ammonium hydroxide to yield a so-called "neutral" polyaniline which nevertheless contains some tosylate (less than 2% tosylate per phenyl-nitrogen repeat). This PCT patent reference illustrates the use of polyaniline coatings containing other ingredients, such as dispersing liquids, binders, pigments, and the like, rather than a neat polyaniline coating.

SUMMARY OF THE INVENTION

The present invention, in its broadest embodiment, relates to a corrosion resistant metal article which comprises: (a) a metal body normally prone to corrosion when subjected to potentially corrosive conditions, other than stainless steel or a metal similar to stainless steel; and (b) a neat coating of neutral, undoped polyaniline in the emeraldine base form on the metal body.

DESCRIPTION OF PREFERRED EMBODIMENTS

As described before, the present invention, in its broadest embodiment, relates to a corrosion resistant metal article which comprises: (a) a metal body normally prone to corrosion when subjected to potentially corrosive conditions; and (b) a neat coating of neutral, undoped polyaniline in the emeraldine base form on the metal body.

The present invention is useful with any metal which will be prone to undergo corrosion. In contrast to the above-described publication of N. Ahmad et al. relating to the coating of steel similar to stainless steel with the emeraldine base form of polyaniline, this invention relates to the corrosion protection of a metal body normally prone to corrosion when subjected to potentially corrosive conditions. Examples of such metals include those which are ferrous in nature, including mild steel, which can be viewed as a "compound" metal comprising iron and a lesser amount of carbon. The term "compound metal" as used herein is intended to by synonymous with the term "alloy". Another metal which can be treated in accordance with the present invention is copper, such as used in electronic applications. Other metals which can be coated include steel alloys, aluminum, aluminum alloys, and other non-noble metals.

The polyaniline material which is used in accordance with the present invention is the well-known emeraldine base form of polyaniline and which can be easily formed by the oxidative polymerization of aniline in excess hydrochloric acid by ammonium persulfate followed by treatment with ammonium hydroxide as described, for example, by A. G. MacDiarmid and coworkers in Conducting Polymers (L. Alcacer, ed.), D. Reidel Publishing Co., Dordrecht, The Netherlands, 1987, p. 105–119. This material, which is illustrated, for example at page 10, line 11 to page 12, line 29 of PCT International Patent Publication No. WO 93/14166, will have recurring backbone monomeric units that are (1) substituted or unsubstituted phenyl rings and amine linkages (—NH— or —NR—, where R can be lower alkyl, such as methyl, ethyl, or propyl or lower alkoxy, such as methoxy, ethoxy, or propoxy) and (2) substituted or unsubstituted quinoid rings and imine (—N=) linkages. The substituents on either or both of the phenyl and quinoid rings can be the same as R as previously defined. In general, the proportion the phenyl and amine-containing structures, shown as Formula II in the above-cited PCT patent reference, in the polyaniline can range from about 0.35 to about 0.65. Oligomers of up to about 1000 repeat units of both units (1) and (2) can be used, if desired.

The foregoing type of polyaniline material is advantageously applied to the selected metal by such means as by: brush or roller; air or airless spray; electrostatic, hot or steam spraying; aerosol spray; dip, flow or electro deposition coating; roller coating machines; or powder coating. Heat treatment, e.g., at from about 120° C. to about 300° C. can be used to enhance the adhesion of this coating to the metal and ultimate degree of corrosion protection obtained, if desired. The coating, unlike the ones described in the foregoing PCT patent publication, is substantially free of other components or additives, such as, dispersion liquid(s), binder(s), pigment(s), extender(s), surfactant(s), and/or thickener(s).

When neutral, updoped polyaniline in the emeraldine base form is applied to the type of metal described hereinbefore, a chemical reaction may occur between the metal and the polyaniline, converting the polyaniline at least pasrtially to a reduced form (the so-called "leucoemeraldine base" form or "LEB"). It is intended that the terminolgy "neutral, updoped polyaniline in the emeraldine base form" as used herein is intended to include the partially reduced forms of polyaniline after coating onto the metal.

The present invention is further illustrated by the Examples which follow.

EXAMPLE 1

Polyaniline emeraldine base (0.5 gm) was dissolved in 9.5 gm of N-methylpyrrolidinone (NMP) with stirring. Undissolved solid was removed from the solution by filtration. Approximately 10 drops of the resulting solution were placed along one end of an aluminum coupon (Aluminum 6061T6 4 inch × 4 inch × 0.32 inch, cut only: unpolished, Advanced Coatings Technology, Hillsdale Mich. 49242-0735). The polymer solution was spread over the coupon with a #24 wire-wound 0.25 inch diameter rod (RDS, Webster, N.Y.). Samples coated in this manner were placed in a vented drying oven (Blue M, General Signal, Blue Island, Ill. 60406) at 150° C. for five to ten minutes, then cooled by immersion in room temperature water and then air dried. Coatings prepared in this way were smooth and even, did not flake when scratched, and were not easily removed with solvent wiping.

EXAMPLE 2

In a manner analogous to that described in Example 1, above, cold rolled steel coupons (ACT, Hillsdale, Mich. 49242-0735, APR10157, 3 inch × 6 inch × 0.032 inch, cleaned with methylethylketone and acetone), coated with a 5% solution of polyaniline EB in NMP, and then dried as described above, had smooth, strongly adhering coatings which were also not easily removed from the substrate.

EXAMPLES 3–12

Polyaniline emeraldine base (PANI) was dissolved in NMP and bar-coated on cold rolled steel coupons, as previously described in Example 2. Samples were dried by one of the following methods: (a) allowed to stand overnight at ambient temperature; (b) oven-dried at 82° C. for two and one-half hours, then cooled over a period of several hours to room temperature; or (c) dried for five minutes at 155° C. and then quenched by immersion in a room temperature water bath and then allowed to air dry.

Adhesion of the PANI coating was tested by the tape method: a single edged razor blade was used to cut lines through the coatings into the substrate steel. Two sets of parallel lines about 1 mm apart, were scribed to create "boxes" of about 1 cm² area in the coating. SCOTCH brand Magic tape was then applied with thumbnail pressure over the entire scribed area and was subsequently removed by slow peeling with pulling back of the tape in a direction parallel to the plane of the coating. The approximate area of metal made bare by this process is reported below:

| Example No. | Cure Temperature (°C.) | Approximate Area of Bare Metal |
| --- | --- | --- |
| Cold rolled steel substrate | | |
| 3 | 25 | 25% |
| 4 | 25 | 12% |
| 5 | 83 | 0% |
| 6 | 83 | 1% |
| 7 | 155 | 1% |
| Aluminum substrate | | |
| 8 | 25 | 2% |
| 9 | 25 | 1% |
| 10 | 83 | 1% |
| 11 | 83 | 0% |
| 12 | 155 | 2% |

The above data show enhanced adhesion for the coatings on the steel substrate as the temperature reaches 83° C. or above as compared to room temperature.

EXAMPLES 13–14

These Examples give the results of measurements of the corrosion potential for certain samples.

The open-circuit or corrosion potentials of spin coated (2000 rpm for 30 seconds) coated steel samples were measured in the following manner: a 5 wt % aqueous solution of sodium chloride was poured into a glass cylinder which was fixed to the coated sample with silicone grease; the signal electrode of a high impedance digital multimeter was clipped to bare steel of the substrate; the negative lead was connected to a saturated calomel electrode which was connected by a salt bridge to the sodium chloride solution. The following results were obtained with PANI-coated steel samples using either a low (room) cure temperature (25° C.) or a high cure temperature (146° C. for five minutes followed by quenching in room temperature water):

| Time of Exposure To Salt Bridge (min) | High Temperature Cured Sample | Low Temperature Cured Sample |
| --- | --- | --- |
| 30 | −0.595 V | −0.620 V |
| 225 | −0.662 V | −0.668 V |

A naked steel control exhibited a more negative, less noble corrosion potential of −0.753V versus SCE after three hours and forty-five minutes exposure. A galvanized steel panel, which contains a sacrificial zinc coating, had a corrosion potential of −1.082V after thirty and forty-five minutes.

The more positive corrosion potential exhibited by the PANI-coated steel, when subjected to a high temperature cure, is indicative of a more noble, less easily oxidized surface as compared to the other samples tested. While high temperature cured samples showed some degree of deterioration over the time periods tested, these samples maintained a more positive corrosion potential at both times tested than did the sample that was cured at room temperature.

EXAMPLES 15–19

These Examples demonstrate the corrosion protection provided to steel by neat PANI-EB primer coatings, dried at elevated temperature, in a salt fog corrosion test.

The general procedure in salt fog testing is the following: cold rolled steel panels (LTV CQ, 0.1749 inch, cold rolled steel with BONDERITE 902 adhesion promoter, LTV Steel Co., Independence, Ohio 44131) were bar coated with 5% solutions of polyaniline emeraldine base in NMP and were then heated to various temperatures or were coated with standard primer (epoxy resin containing chromate corrosion inhibiting pigment). All panels were topcoated (0.8 mil dry film thickness) with CERAM-A-SIL melamine-polyester resin from Akzo Nobel Coatings Inc. and were cured at 450° F. peak metal temperature. Samples were scribed to expose a line of bare metal and were then placed in a salt fog chamber for seven hundred hours. Performance was evaluated on a scale of 1 (best) to 5 (worst) by visual inspection and averaging appearance and size of blisters and rust formation near the scribe, away from the scribe, and along the edge of the panel. The results were as follows:

| Sample No. | PANI-EB Dry Film Thickness (mil) | Dry/Cure Temp. (F.) | Ranking |
|---|---|---|---|
| 15 | None (Control) | None (Neg. Control) | 5 |
| 16 | 0.075–0.1 | 340/20 min. | 5 |
| 17 | 0.075–0.1 | 420 | 3 |
| 18 | 0.075–0.1 | 435 | 2 |
| 19 | 0.1(Cr/epoxy primer)* | 465 | 1 |

*Example 19 was a positive control, representing an embodiment in regard to present commercial-type practice

EXAMPLES 20–21

These Examples give the results of measurements of open circuit, corrosion potential of cold-rolled steel sample either without coating or coated with polyaniline emeraldine base. Polyaniline emeraldine base (1.2 gm) was dissolved in 22.8 gm of NMP. A sample of cold rolled steel pretreated with BONDERITE 1000 adhesion promoter (Advanced Coating Technologies, Hillsdale, Mich. 49242-0735) was cleaned with MEK solvent and BONDERITE pretreatment was removed by scrubbing with a SCOTCH BRITE pad. The PANI solution was bar-coated on the steel panel with a #60 wire wound rod, dried of solvent at 165° F. Corrosion potentials were determined in the following manner: a 5% (w/w) aqueous solution of NaCl was poured into a glass cylinder (approximate dimensions: 1 inch diameter, 2.5 inch height) which was fixed to the coated sample with silicone grease. The negative lead of a high impedance digital multimeter (Fluke 73) was connected via a salt bridge to a saturated calomel electrode placed in the NaCl solution; the signal electrode of the DMM was clipped to bare steel of the substrate.

| Time of Exposure of Sample to 5% NaCl | Unprotected Steel | Steel Coated with PANI-EB |
|---|---|---|
| 10 minutes | −0.461 V | −0.431 V |
| 40 minutes | — | −0.466 V |
| 4 hours | −0.687 V | — |
| 21 hours | — | −0.521 V |

The foregoing Examples should not be construed in a limiting sense since they are intended to merely illustrate certain embodiments of the present invention. The scope of protection sought is set forth in the claims which follow.

I claim:

1. A corrosion resistant metal article which comprises: (a) a metal body, comprising aluminum, normally prone to corrosion when subjected to potentially corrosive conditions; and (b) a coating of neutral, undoped polyaniline in the emeraldine base form on the metal body.

* * * * *